Sept. 28, 1965   F. W. LINDBLOM   3,209,366
AUXILIARY NOSE PIECE FOR SPECTACLE FRAMES
Filed Feb. 7, 1962

INVENTOR.
FRANK W. LINDBLOM
BY
Barlow & Barlow
ATTORNEYS

United States Patent Office 3,209,366
Patented Sept. 28, 1965

3,209,366
AUXILIARY NOSE PIECE FOR SPECTACLE FRAMES
Frank W. Lindblom, Warwick, R.I., assignor to Welsh Manufacturing Company, a corporation of Rhode Island
Filed Feb. 7, 1962, Ser. No. 171,775
1 Claim. (Cl. 351—130)

This invention relates to auxiliary nose pieces for spectacle frames which nose pieces are adapted to be detachably secured to the inner marginal portions of the lens frames at a position adjacent the bridge portion of the frame.

Spectacles have been made for many years embodying the general construction of a bridge joining the upper portion of a pair of lens frames together with a pair of nose pads, the mountings for which protrude rearwardly from locations adjacent the bridge. Nose pads have been the sole supporting structure for spectacle frames, and in order to space the nose pads varying distances apart to accommodate various sizes of noses, it has been customary to provide a range of bridge sizes or lengths of bridges varying anywhere from 20 mm. to 26 mm., and this of course means that a number of frames must be stocked by a supplier, and thus in the last few years it has become popular to utilize what is known as the universal fit type of frame which embodies a combined bridge and nose pad section that is contoured to provide a fit for a number of noses over a wide size range. Such universal fit devices, while they are useful, will of course not work accurately with optical devices where the pupillary distances must be maintained but are adequate and extremely satisfactory for the industrial protective spectacles and sunglasses where no pupillary distance dimension must be maintained. Further some applications require the use of metal frame spectacles for high rigidity and strength of the frame member itself, and accordingly it is desirable to provide the universal fit feature in connection with such spectacles.

It is accordingly the main object of this invention to provide an auxiliary nose piece which can be used with existing metal frame spectacles and which may be readily attached and detached from the spectacles.

A further object of the invention is to provide a simple, economical and effective auxiliary nose piece of a lightweight material which will not detract from the physical appearance of the spectacles.

With these and other objects in view, the invention consists of certain novel features of construction as will be more fully described and particularly pointed out in the appended claim.

Figure 1:
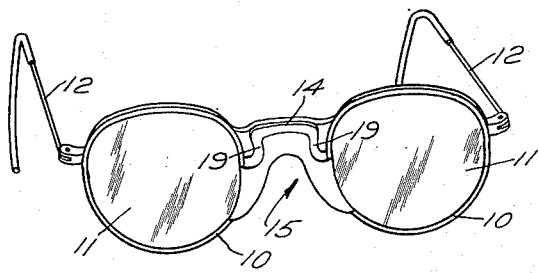
FIG. 1 is a perspective view illustrating a pair of metal frame spectacles with the auxiliary nose pad of my invention attached thereto.

The spectacle frames upon which the invention is applicable may be conventional frames of the goggle or spectacle type insofar as they include the basic parts, namely, lens rims 10 carrying lenses 11, temples 12 and a bridge structure 14 connecting the lenses together.

The invention provides an auxiliary nose piece generally designated 15 which is preferably made as a single integral unitary article that may be easily attached and detached from the frame at the bridge portion thereof. Preferably the nose piece is made of a suitable type of moldable plastic, but it may also be made of metal or any forgable materials if desired.

Referring more particularly to FIGURES 3–6, the nose piece comprises two distinct areas, an upper area or bridge portion, generally designated 16, which includes and is complemental to the bridge portion 14 of the spectacles and arm portions generally designated 17. The bridge portion 16 being designed to be complemental to the bridge 14 is formed with a recess 20 which opens from the front face of the nose piece and which is provided with a wall 21 that is adapted to abut the underside of the bridge 14. As will be noticed by referring to the drawing, the bridge 14 in the instant example is made with a pair of modified S shape arms 19, and these modified S shape arms are snugly received by the wall 21 as at the section designated 22—22. Additionally, the back wall 23 of the recess 20 is arcuate and shaped to abut the rear face of the bridge 14. As will be seen particularly in FIG. 4, the wall 23 of this recess is of arcuate section in the example given, but this particular section may vary depending upon the particular configuration of the bridge 14 and the spectacles with which the auxiliary nose pad is adapted to be used.

The arm portions 17 basically depend from either end of the bridge section 16 and consist principally of pad areas 25—25 which are adapted to rest on the nose. The pad areas project rearwardly from the front face of the nose piece and are formed in a contour where they blend in with the concavity at the bridge section designated by the reference numeral 26. The blending of these shapes is a technique known well to those skilled in the art and forms no particular part of this invention. Each of the arms 17 are formed with a groove 28 which is adapted to receive a lens rim 10. This groove 28, as will be seen particularly in FIG. 4, extends into the recess area 20 of the nose piece and can be said in one way to be a continuation of this receiving concavity or recess.

Figure 2:
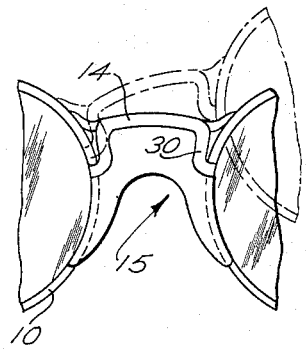
FIG. 2 is an enlarged front view showing the auxiliary nose piece inserted and the method of inserting the same.
Figure 3:
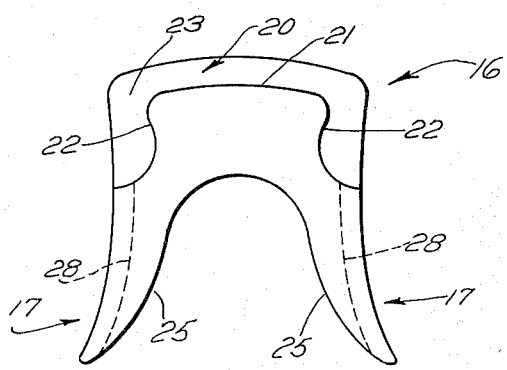
FIG. 3 is a greatly enlarged front view of the auxiliary nose piece.
Figure 4:
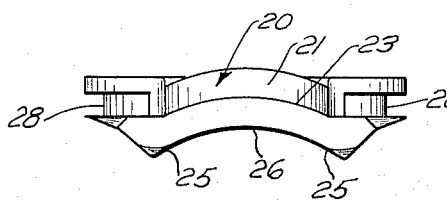
FIGS. 4 and 5 are top and bottom views respectively of the auxiliary nose pad.
Figure 5:
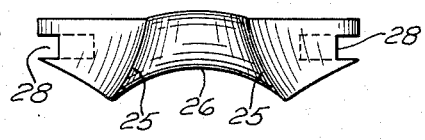
Figure 6:
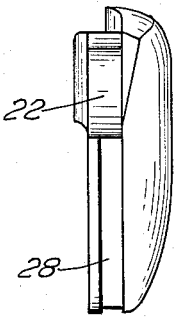
FIG. 6 is an edge view of the auxiliary nose pad.

The nose piece is secured to the frame by first sliding one half thereof consisting of one arm portion into engagement with a lens rim so that the groove 28 receives one of the lens rims 10. As the nose piece is slid upwardly towards the bridge portion, the lens rims may be sprung apart by bending them as illustrated in FIG. 2 until sufficient clearance is had to snap the nose piece in a position within the bridge area of the spectacle. At this point in the operation the wall 23 abuts the rear portion of the bridge 14 and the grooves 28 firmly receive the lens rims 10. Also in the particular construction illustrated herein, the particular S shaped ends of the bridge 14 will adapt themselves to prevent downward movement of the nose piece from this engagement. If the bridge 14 were not made with a slight S shape or an indentation as at 30 (see FIG. 2), then it would be apparent that the only force holding the nose piece in position would be the frictional contact that the grooves 28 would have with the rims 10. Accordingly, in addition to the frictional contact that perhaps could be provided by the grooves 28 and the lens rims 10, the bridge having a portion thereof which extends towards itself in a pseudo-keyhole shape will provide the necessary holding action to maintain the nose piece in position. It will be apparent, therefore, that this invention not only provides a nose piece that can be easily attached to and removed from an ophthalmic mounting but also one which does not unduly distract from the physical appearance of the spectacles.

I claim:

In combination with spectacles having rigid lens frames with a bridge joining the lens frames, the bridge having a pair of legs of S shape in plan oppositely formed to provide a pseudo keyhole in substantially the plane of the lenses with the distance between the upper portion of the legs being of a greater extent than the distance between the lower portion of the legs, a detachable nose piece comprising a unitary molded member with a pair of diverging arms, said arms forming nose pads, said arms each having a grooved channel on the outer edge of the arms of complemental shape to the inner portions of the lens frames below the bridge and receiving said portions of the lens frames, the front face of said member having a recess across its upper portion and having recesses joining therewith at either side along said arms leaving a portion of reduced uniform thickness with the side recesses having an edge wall of a shape complemental to said S shape legs providing a face portion between the side recesses having an upper width greater than the lower width between and complemental to the shape of the bridge receiving the S shape legs and preventing up or down movement in generally the plane of the lens frames, the upper edge of the nose piece being coextensive with the upper edge of the said bridge and said grooved channels opening into the lower portions of the said side recesses.

References Cited by the Examiner

UNITED STATES PATENTS

| | | | |
|---|---|---|---|
| 1,001,734 | 8/11 | Day | 88—55 |
| 2,345,065 | 3/44 | Nerney | 351—94 |
| 2,727,436 | 12/55 | Prince | 351—98 |
| 2,774,279 | 12/56 | Olson et al. | 88—43 |
| 2,801,569 | 8/57 | Ralph | 88—55 X |
| 2,991,694 | 7/61 | Whipple | 351—91 |
| 3,016,797 | 1/62 | Liautaud | 88—43 |

DAVID H. RUBIN, *Primary Examiner.*

JEWELL H. PEDERSEN, *Examiner.*